United States Patent [19]
Endo

[11] Patent Number: 5,943,937
[45] Date of Patent: Aug. 31, 1999

[54] PRESSURE DIFFERENTIAL OPERATED BRAKE BOOSTER

[75] Inventor: Mitsuhiro Endo, Yamanashi-ken, Japan

[73] Assignee: Tokico Ltd., Kawasaki, Japan

[21] Appl. No.: 08/865,999

[22] Filed: May 30, 1997

[30] Foreign Application Priority Data

May 30, 1996 [JP] Japan ................................. 8-158956

[51] Int. Cl.$^6$ ............................................. F15B 9/10
[52] U.S. Cl. ........................................ 91/369.2; 91/376 R
[58] Field of Search ............................ 91/369.1, 369.2, 91/376 R

[56] References Cited

U.S. PATENT DOCUMENTS

| | | | |
|---|---|---|---|
| 4,970,940 | 11/1990 | Boehm et al. ........................... | 91/369.2 |
| 5,226,291 | 7/1993 | Osterday et al. .................... | 91/369.2 X |
| 5,261,313 | 11/1993 | Yared ................................. | 91/369.2 X |
| 5,263,398 | 11/1993 | Kobayashi et al. ..................... | 91/369.2 |
| 5,425,302 | 6/1995 | Levrai et al. ........................... | 91/369.2 |

FOREIGN PATENT DOCUMENTS

| | | |
|---|---|---|
| 19534728A1 | 3/1996 | Germany . |
| 59-195460 | 11/1984 | Japan . |
| 404257760 | 9/1992 | Japan ..................................... 91/369.2 |
| 4-257760 | 11/1992 | Japan . |

*Primary Examiner*—Hoang Nguyen
*Attorney, Agent, or Firm*—Wenderoth, Lind & Ponack, L.L.P.

[57] ABSTRACT

A pressure differential operated brake booster includes a housing, a diaphragm assembly adapted to divide the interior of the housing into a constant pressure chamber and a variable pressure chamber, a valve body carried by the diaphragm assembly, a valve mechanism arranged within the valve body and including a plunger connected to an input rod, and a reaction assembly disposed between the plunger and an output rod. The valve mechanism is operable to develop a pressure differential across the diaphragm assembly to transmit its movement to the output rod and feed part of the resulting reaction force back to the input rod through the reaction assembly and the plunger. The reaction assembly includes a front reaction disk and a separate rear reaction disk having a diameter less than that of the front reaction disk and greater than that of the plunger. The front reaction disk is disposed between the valve body and the output rod. The valve body has at its front end a recess to receive the rear reaction disk. The plunger has a front end extending slightly into the recess.

10 Claims, 5 Drawing Sheets

PRESSURE DIFFERENTIAL OPERATED BRAKE BOOSTER

BACKGROUND OF THE INVENTION

The present invention relates to a pressure differential operated brake booster for use in a vehicle hydraulic braking system.

A conventional pressure differential operated brake booster typically includes a housing divided into a constant pressure chamber and a variable pressure chamber by a diaphragm assembly. A valve body is carried by the diaphragm assembly and extends through the rear wall of the housing. A valve mechanism is disposed within the valve body and includes a plunger operatively connected to an input rod. An output rod is operatively connected to the front end of the valve body through a reaction disk. The valve mechanism is operable to develop a pressure differential across the diaphragm assembly to thereby move the diaphragm assembly forward or in a direction toward the output rod. This movement of the diaphragm assembly is transmitted to the output rod while the resulting reaction force is fed back to the input rod through the reaction disk and the plunger.

With such an arrangement, the boost ratio is the ratio of the cross-sectional area of the abutting part of the plunger to the cross-sectional area of the abutting part of the output rod. Typically, the ratio of the operative surface areas is increased to provide a high boost ratio so that the boost increases relatively rapidly with increased driver input during an emergency, as shown in FIG. 7. In FIG. 7, the numeral J represents a so-called "jump-in" output. This output is obtained under the influence of a clearance formed between the reaction disk and the plunger. The larger the clearance, the higher the level of deceleration.

However, with such a high boost ratio, an undesirably high degree of output force is produced even when a brake foot pedal is lightly depressed during normal braking. This causes a deterioration in the operability of the brake.

To this end, there has been proposed reaction means composed of inner and outer disks as disclosed in Japanese laid-open patent publication No. 59-195460. When a light pedal force is applied, the inner disk is first brought into contact with an output rod so as to provide a low boost ratio. Where the inner disk has the same diameter as a plunger (see FIG. 3 of the '406 publication), a reaction force is wholly fed back to an input rod. Also, where a part of the inner disk abuts a valve body (see FIGS. 5 and 7 of the '460 publication), a substantial part of the reaction force is transmitted to the input rod. In either case, a driver suffers from uncomfortable feel during operation of the brake pedal.

Accordingly, it is an object of the present invention to provide a pressure differential operated brake booster which enables various changes in boost ratio without any deterioration in brake pedal feel.

SUMMARY OF THE INVENTION

According to the present invention, there is provided a pressure differential operated brake booster comprising a housing, movable wall means operatively arranged within the housing and adapted to divide the interior of the housing into a constant pressure chamber and a variable pressure chamber. A valve body is carried by the movable wall means and extends rearwardly through the housing. A valve mechanism is arranged within the valve body and includes a plunger connected to an input rod. Also, a reaction means is disposed between the front end of the valve body and an output rod. The valve mechanism is operable to develop a pressure differential across the movable wall means to transmit movement of the movable wall means to the output rod and to feed part of the resulting reaction force back to the input rod through the reaction means and the plunger. As a feature of the present invention, the reaction means includes a front reaction disk and a separate rear reaction disk having a diameter less than that of the front reaction disk and greater than that of the plunger. The front reaction disk is disposed between the valve body and the output rod. The valve body has at its front end a recess to receive the rear reaction disk. The plunger has a front end extending slightly into the recess.

Where a relatively small input force is applied, the rear reaction disk is free from deformation. The boost ratio is thus the ratio of the cross-sectional area of the abutting part of the rear reaction disk to the cross-sectional area of the abutting part of the output rod relative to the front disk. When the input force is increased beyond a predetermined level, the rear reaction disk is expanded under pressure. This causes the rear reaction disk to enter the recess and to abut the bottom of the recess. At this time, the boost ratio is the ratio of the cross-sectional area of the abutting part of the plunger relative to the rear reaction disk to the cross-sectional area of the abutting part of the output rod relative to the front reaction disk. As such, the boost ratio is less during application of a relatively small input force than during application of a relatively large input force.

In order to produce a "jump-in" output force, the rear reaction disk is preferably free to move axially between the plunger and the front reaction disk when no power assistance is provided.

BRIEF DESCRIPTION OF THE DRAWINGS

The present invention will now be described, by way of example, with reference to the accompanying drawings in which.

DESCRIPTION OF PREFERRED EMBODIMENTS

Figure 1:
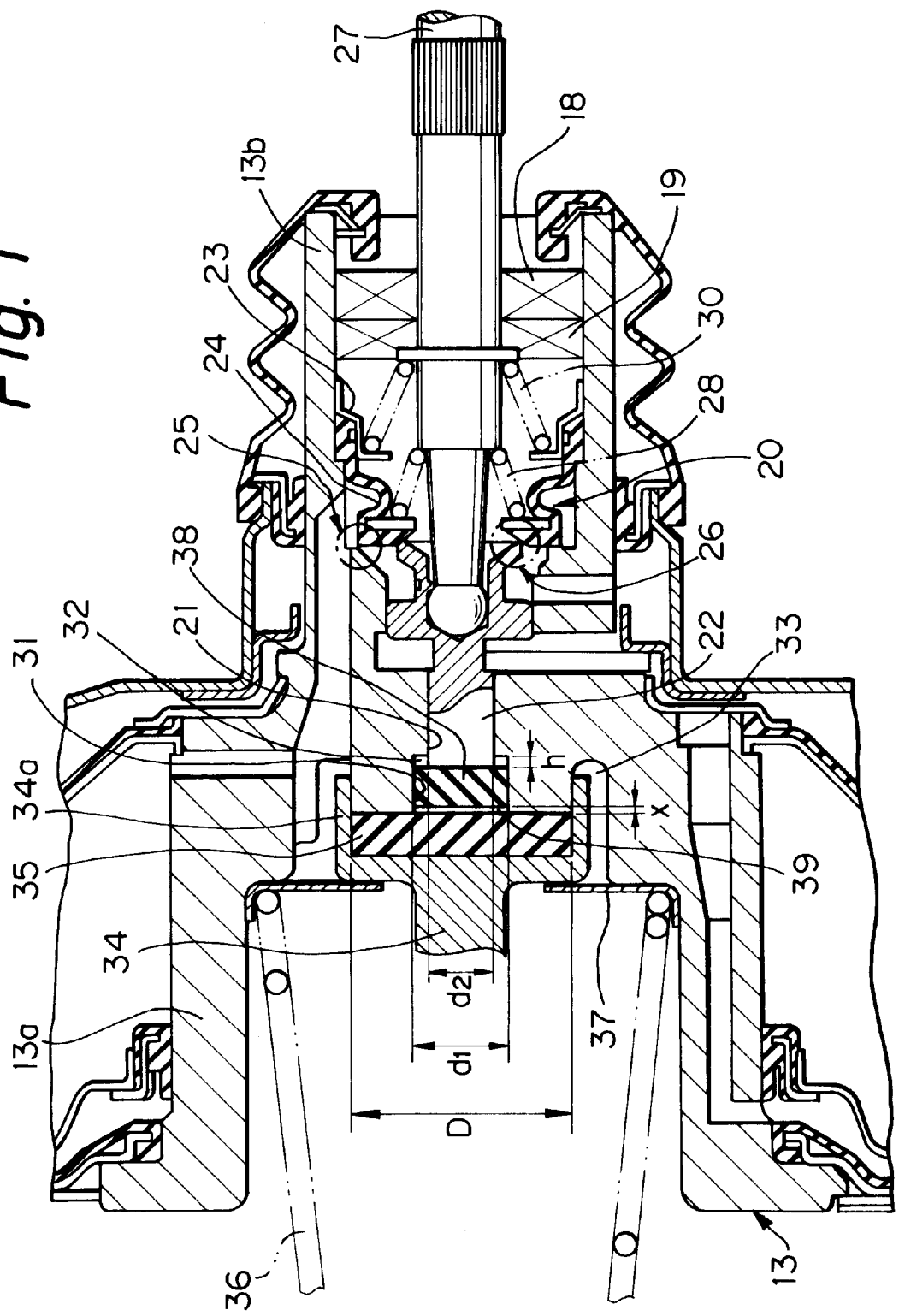
FIG. 1 is a sectional view showing the principal part of a tandem vacuum booster according to one embodiment of the present invention.
Figure 2:
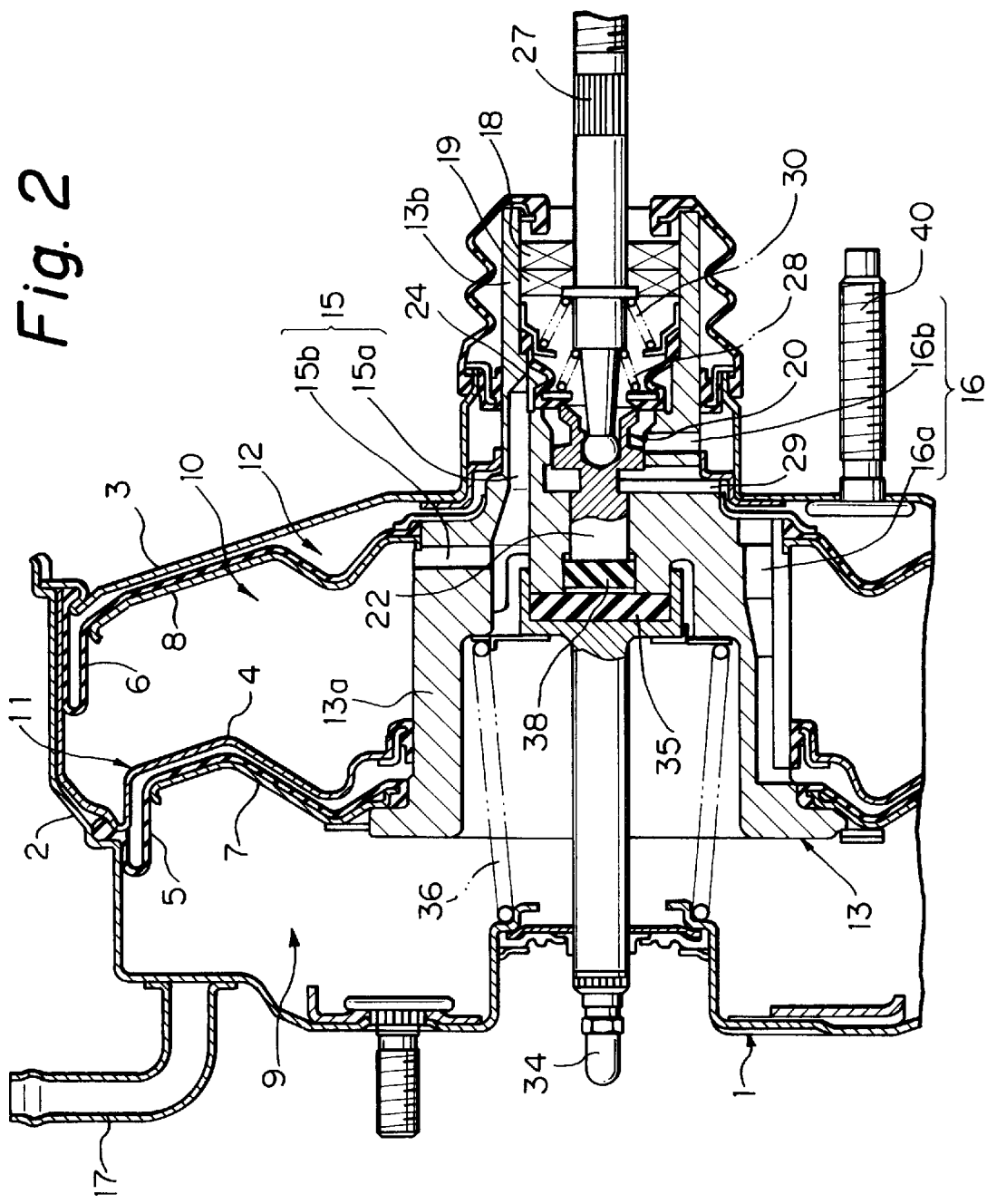
FIG. 2 is a sectional view showing the overall structure of the brake booster.

A tandem brake booster illustrated in FIGS. 1 and 2 includes a housing 1 composed of a front shell 2 and a rear shell 3 joined together around their outer peripheries to form a closed unit. The interior of the housing 1 is divided into front and rear chambers by a center shell 4. The interior of the front chamber is further divided into a constant pressure chamber 9 and a working or variable pressure chamber 11 by a power piston or diaphragm assembly 7. Similarly, the interior of the rear chamber is divided into a constant pressure chamber 10 and a variable pressure chamber 12 by a diaphragm assembly 8. An axially reciprocable valve body 13 is carried by the diaphragm assemblies 7, 8 and includes a hub 13a and a tubular extension 13b. The tubular extension 13b extends sealably and slidably through the rear shell 3.

The valve body 13 includes a vacuum passage means 15, and a working (air) passage means 16. The vacuum passage means 15 provides communication between the two constant pressure chambers 9, 10 and has an axial port 15a, and a radial port 15b. The working passage means 16 includes an axial port 16a adapted to provide communication between the two variable pressure chambers 11, 12, and a radial port 16b adapted to provide communication between the two variable pressure chambers 11, 12 and the interior of the tubular extension 13b. A line 17 extends between the front shell 2 and a source of vacuum such as the intake manifold of a vehicle engine. A silencer 18 and a filter 19 are mounted within the free end of the tubular extension 13b of the valve body 13.

Within the valve body 13, a control valve mechanism 20 is provided so as to selectively communicate the variable pressure chambers 11, 12 with the vacuum passage means 15 and the working passage means 16. The valve mechanism 20 generally comprises a plunger 22 slidably fit within an axial bore (plunger bore) 21 formed in the hub 13a, a deformable poppet member 24 secured at its proximal end to the inner surface of the tubular extension 13b by a locking ring or retainer 23, a vacuum valve, as encircled at 25 in FIG. 1, formed by the outer peripheral edge of the front end of the poppet member 24 and a portion of the hub 18a adjacent to the rear end of the axial passage 15a, and a working valve, as encircled at 26 in FIG. 1, formed by the inner peripheral edge of the front end of the poppet member 24 and the extreme right hand portion of the plunger 22. The plunger 22 is connected at its rear end to an input rod 27 which in turn, is operatively connected to a brake foot pedal (not shown). A spring 28 has one end engaged with the input rod 27 and the other end engaged with the poppet member 24 whereby the poppet member 24 is normally urged so as to close the vacuum valve 25 and the working valve 26. A key 29 is inserted radially into the valve body 13 to limit axial sliding movement of the plunger 22 relative to the valve body 13. A return spring 30 has one end engaged with the retainer 23 and the other end engaged with the input rod 27 so as to normally urge the input rod 27 in a direction toward the brake pedal (i.e., to the right in FIG. 2).

The hub 13a of the valve body 13 has a recess 31 formed in coaxial relation to the axial or plunger bore 21. The front end of the plunger 22 extends slightly into the recess 31. The recess 31 has a diameter d1. The plunger bore 21 or plunger 22 has a diameter d2 which is less than the diameter d1 of the recess 31 (d1>d2). With this arrangement, an annular space 32 is defined in the bottom of the recess 31 and extends around the plunger 22. The annular space 32 has a depth h. Another annular space 33 is defined in the hub 13a and extends around the recess 31. An output rod 34 has an enlarged end 34a. The enlarged end 34a of the output rod 34 is inserted into the annular space 33 and fitted over the front end of the hub 13a. The front end of the output rod 34 extends sealably through the front shell 2 and is operatively connected, for example, to a master cylinder.

The enlarged end 34a of the output rod 34 is in the form of a cup. A front reaction disk 35 is contained within the enlarged end 34a of the output rod 34 and urged against the valve body 13 by a return spring 36. The return spring 36 is seated on a spring seat 37 and extends between the front shell 2 and the valve body 13. With this arrangement, the front reaction disk 35 is held in contact with the front end of the hub 13a. A separate rear reaction disk 38 is disposed within the recess 31. The front and rear reaction disks 35, 38 collectively form reaction means. The recess 31 has a depth so that the rear reaction disk 38 is slightly movable between the front reaction disk 35 and the plunger 22. When the rear reaction disk 38 is placed in contact with the plunger 22, a clearance 39 having a size X is left between the rear reaction disk 38 and the front reaction disk 35. The front reaction disk 35 is substantially identical in structure to those used in the art and has a diameter D which is significantly greater than the diameter d1 of the recess 31.

As shown in FIG. 2, a plurality of stud bolts 40 extend from the back of the rear shell 3 and serve to mount the brake booster to a vehicle bulkhead (not shown). With the brake booster thus mounted, the brake pedal is connected to the input rod. In use, when a pedal force (input load) becomes greater than the pre-load of the spring 30, the plunger 22 is moved to the left in FIGS. 1 and 2. The working valve 26 is then opened to admit atmospheric air to enter the tubular extension 13b of the valve body 13. The air thus entered flows through the ports 16b, 16a into the two variable pressure chambers 12, 11. As a result, a pressure differential is developed across the diaphragm assemblies 7, 8. The diaphragm assemblies 7, 8 are then advanced so as to provide power assisted input to the output rod 34 via the valve body 13. A part of the resulting reaction force is fed back to the input rod 27 through the front reaction disk 35, the rear reaction disk 38 and the plunger 22.

Figure 4:
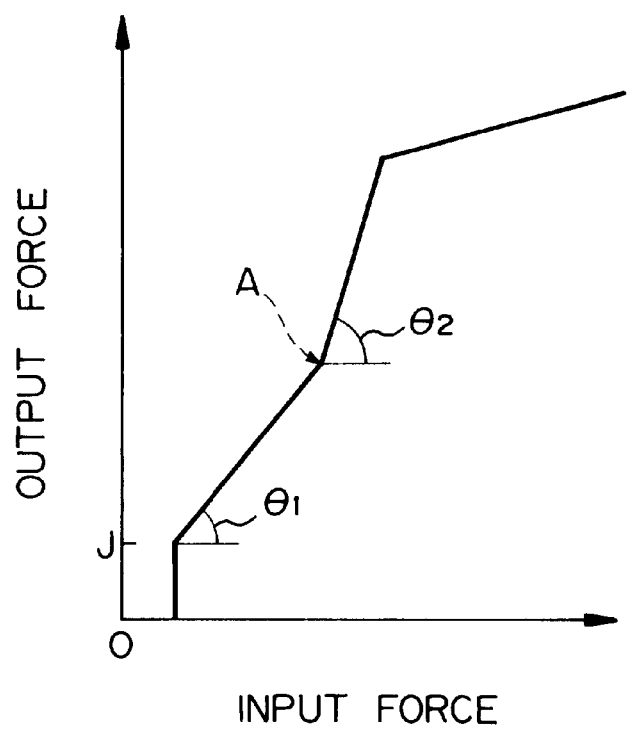
FIG. 4 is a graph showing the output force achieved in relation to a given input force.

FIG. 4 illustrates the operational function of the brake booster, that is, input force v.s. output force. At the initial stage of power assistance, a clearance 39 between the front reaction disk 35 and the rear reaction disk 38 is taken up to thereby provide a "jump-in" output force J. After the rear reaction disk 38 is brought into contact with the front reaction disk 35, the boost increases progressively with increased driver input. The rear reaction disk 38 is free from deformation where the input force is relatively small. At this time, the boost ratio tan $\theta_1$ is represented as follows.

$$\tan\theta_1 = (D/d1)^2 \qquad (1)$$

where D is the diameter of the front reaction disk 35, and d1 is the diameter of the rear reaction disk 38.

Figure 3:
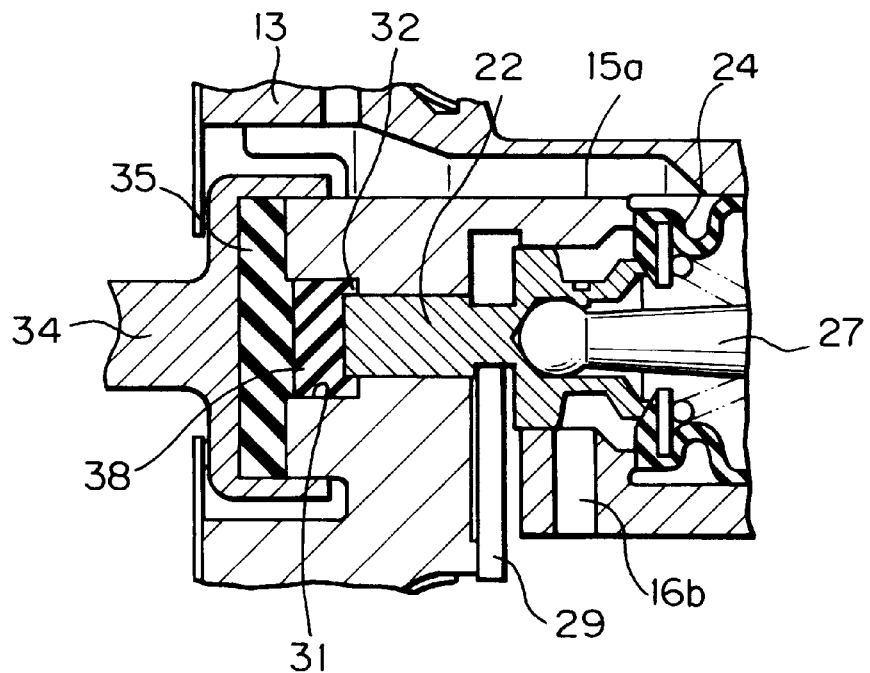
FIG. 3 is an enlarged view of a control valve mechanism shown in FIGS. 1 and 2.

When the input force is increased beyond a predetermined level, a portion of the front reaction disk 35 and the rear reaction disk 38 is expanded under compression. As a result, as shown in FIG. 3, a part of the front reaction disk 35 enters the recess 31 and a part of the rear reaction disk 38 enters the annular space 32 around the plunger 22 and then, abuts the bottom of the recess 31. Therefore, as the input force is further increased, the boost ratio tan $\theta_2$ becomes as follows.

$$\tan\theta_2 = (D/d2)^2 \qquad (2)$$

where D is the diameter of the front reaction disk 35, and d2 is the diameter of the plunger 22.

As previously mentioned, the diameter d1 of the rear reaction disk 38 is greater than the diameter d2 of the plunger 22 (d1>d2). As shown in FIG. 4, a change in boost ratio occurs at point A where a part of the rear reaction disk 38 abuts the bottom of the recess 31. The boost ratio before the point A is less than that after the point A. As such, an undesirably high level of deceleration is in no way produced during normal braking. The driver thus enjoys improved braking performance. Additionally, since the diameter D of the front reaction disk 35 is significantly greater than the diameter d1 of the rear reaction disk 38, reaction force is only partly fed back to the input rod 27. This gives the driver a better feel during operation of the brake pedal.

Figure 5:
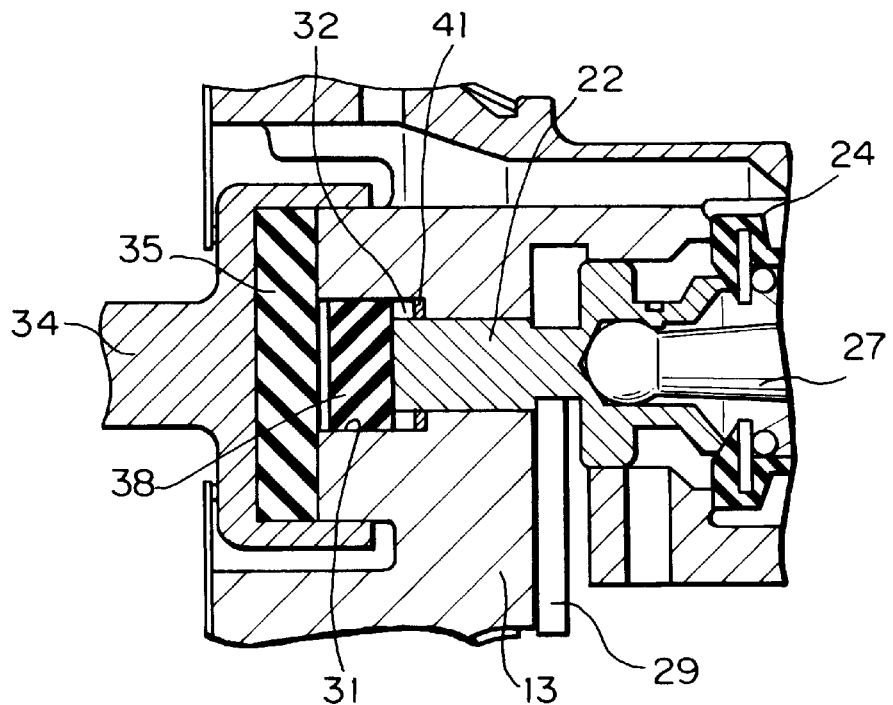
FIG. 5 is a view similar to that of FIG. 3, but showing an alternative embodiment of the invention.

The "knee" point A may shift to either of low input force side and high input force side depending on the depth of the annular space 32 and/or hardness or other physical properties of the front and rear reaction disks 35, 38, provided that the input force giving the "jump-in" point is constant. The "knee" point A may be shifted, for example, by using a different rear disk 38 which has hardness or other physical properties different from that of the currently used rear disk 38 or by alteratively increasing the depth of the space 32, inserting an annular spacer 41 within the space 32 and changing the thickness of the spacer 41 as shown in FIG. 5.

Figure 6:
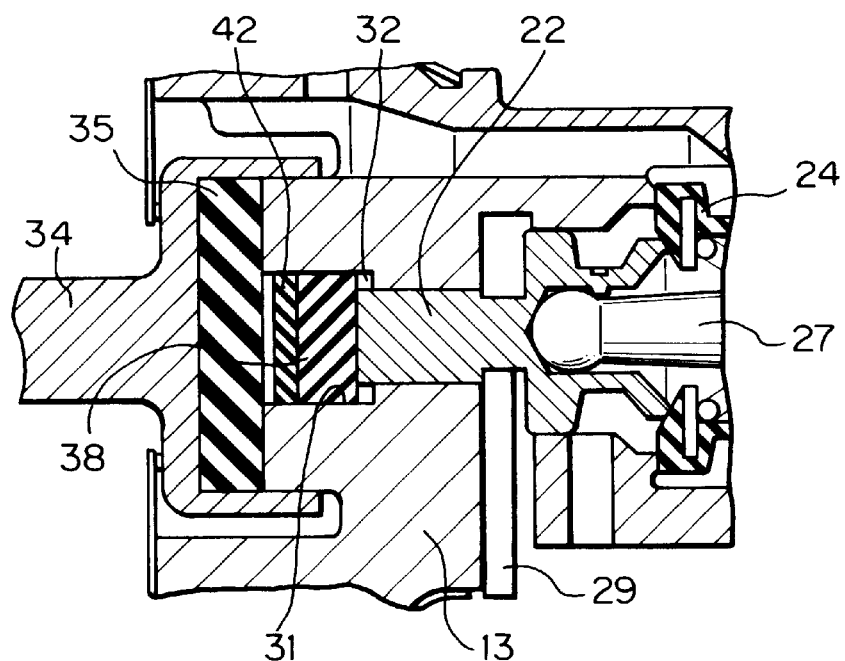
FIG. 6 is a view similar to that of FIG. 3, but showing a further alternative embodiment of the invention.
Figure 7:
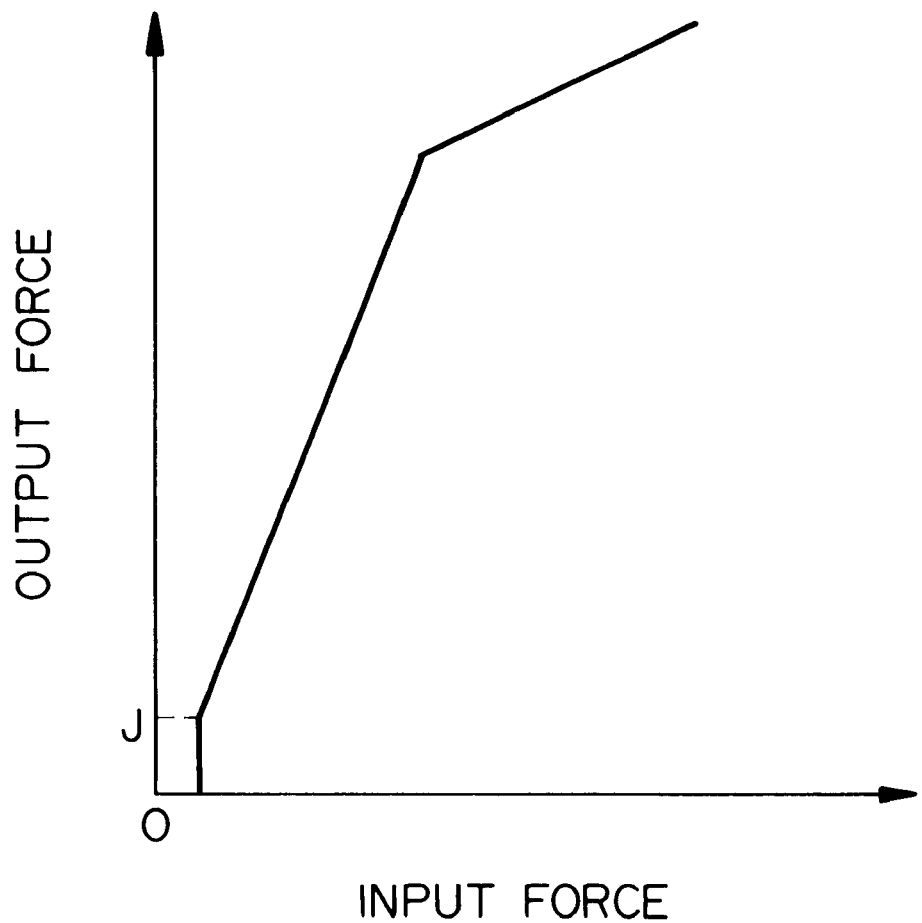
FIG. 7 is a graph showing the operational function (input v.s. output) of a typical brake booster which is known in the art.

The degree of an input force when the "jump-in" force is produced is determined by the size X of the clearance 39 formed between the front reaction disk 35 and the rear reaction disk 38, provided that the rear reaction disk 38 has a constant physical property. The degree of the input force when the "jump-in" output force is produced can readily be changed by changing the thickness of the rear reaction disk 38 or inserting a spacer 42 within the recess 31, as shown in FIG. 6.

With the provision of the two separate reaction disks 35, 38, it is easy to establish desired relationships between the input force and output forces at the "jump-in" and "knee" points, J, and A.

Although the present invention has been described with respect to its preferred embodiments, it will be understood that various modifications and changes may be made without departing from the scope of the invention. For example, the invention is equally applicable to an alternative design of the brake booster which has only a single power piston.

What is claimed is:

1. A pressure differential operated brake booster comprising:
    a housing having an interior;
    movable wall means operatively arranged within said housing and adapted to divide the interior of said housing into a constant pressure chamber and a variable pressure chamber;
    a valve body carried by said movable wall means and extending rearwardly through said housing, said valve body having a front end and a rear end;
    a valve mechanism disposed within said valve body and including a plunger adapted for connection to an input rod; and
    reaction means disposed between the front end of said valve body and an output rod,
    said valve mechanism being operable to develop a pressure differential across said movable wall means to transmit movement of said movable wall means to the output rod and to feed part of a reaction force back to the input rod through said reaction means and said plunger,
    said reaction means including a front reaction disk and a separate rear reaction disk having a diameter less than a diameter of said front reaction disk and greater than a diameter of said plunger, said front reaction disk being disposed between said valve body and the output rod,
    said valve body having a plunger bore for receiving said plunger for axial movement and a recess provided at said front end of said valve body, said recess being continuous with said plunger bore, said plunger bore having a first diameter,
    said recess having a second diameter which is larger than said first diameter of said plunger bore and smaller than said diameter of said front reaction disk, wherein said rear reaction disk is received in said recess and said plunger has a front end which extends slightly into said recess so that an annular space is formed in said recess around said front end of said plunger.

2. A pressure differential operated brake booster as set forth in claim 1, wherein said rear reaction disk is free to move axially between said plunger and said front reaction disk when no power assistance is provided.

3. A pressure differential operated brake booster as set forth in claim 1, wherein said front reaction disk is prevented from radially expanding so that a portion of the front reaction disk enters said recess of the valve body when the front reaction disk is compressed between said output rod and said valve body.

4. A pressure differential operated brake booster as set forth in claim 2, wherein a spacer is disposed between the bottom of said recess of the valve body and said rear reaction disk.

5. A pressure differential operated brake booster as set forth in claim 2, wherein a spacer is disposed in said recess of the valve body between said front and rear reaction disks.

6. A pressure differential operated brake booster comprising:
    a housing having an interior;
    a movable wall structure operatively arranged within said housing and adapted to divide said housing interior into a constant pressure chamber and a variable pressure chamber;
    a valve body carried by said movable wall structure and extending rearwardly through said housing, said valve body having a front end and a rear end;
    a valve mechanism disposed within said valve body and including a plunger adapted for connection to an input rod; and
    a reaction assembly disposed between the front end of said valve body and an output rod,
    said valve mechanism being operable to develop a pressure differential across said movable wall structure to transmit movement of said movable wall structure to the output rod and to feed part of a reaction force back to the input rod through said reaction assembly and said plunger,
    said reaction assembly including a front reaction disk and a separate rear reaction disk having a diameter less than that of said front reaction disk and greater than that of said plunger, said front reaction disk being disposed between said valve body and the output rod,
    said valve body defining a plunger bore, for slidably receiving said plunger for axial movement therein, and a recess provided at said front end of said valve body so that said recess is continuous with said plunger bore,
    said plunger bore having a first diameter, said recess having a second diameter which is larger than said first diameter and smaller than said diameter of said front reaction disk, said rear reaction disk being received in said recess,
    wherein said plunger has a front end which extends slightly into said recess so as to define an annular space in said recess around said front end of said plunger.

7. A pressure differential operated brake booster as set forth in claim 6, wherein said rear reaction disk is free to move axially between said plunger and said front reaction disk when no power assistance is provided.

8. A pressure differential operated brake booster as set forth in claim 6, wherein said front reaction disk is prevented from radially expanding so that a portion of said front reaction disk enters said valve body recess when said front reaction disk is compressed between said output rod and said valve body.

9. A pressure differential operated brake booster as set forth in claim 7, further comprising a spacer disposed between a bottom portion of said valve body recess and said rear reaction disk.

10. A pressure differential operated brake booster as set forth in claim 7, wherein a spacer is disposed in said valve body recess between said front and rear reactions disks.

* * * * *